US010487640B2

(12) United States Patent
Aniket et al.

(10) Patent No.: US 10,487,640 B2
(45) Date of Patent: Nov. 26, 2019

(54) CASING WEAR PREDICTION USING INTEGRATED PHYSICS-DRIVEN AND DATA-DRIVEN MODELS

(71) Applicant: Landmark Graphics Corporation, Houston, TX (US)

(72) Inventors: Aniket, Houston, TX (US); Robello Samuel, Cypress, TX (US); Serkan Dursun, Stafford, TX (US)

(73) Assignee: Landmark Graphics Corporation, Houston, TX (US)

( * ) Notice: Subject to any disclaimer, the term of this patent is extended or adjusted under 35 U.S.C. 154(b) by 222 days.

(21) Appl. No.: 15/509,357

(22) PCT Filed: Oct. 17, 2014

(86) PCT No.: PCT/US2014/061128
§ 371 (c)(1),
(2) Date: Mar. 7, 2017

(87) PCT Pub. No.: WO2016/060984
PCT Pub. Date: Apr. 21, 2016

(65) Prior Publication Data
US 2017/0292362 A1 Oct. 12, 2017

(51) Int. Cl.
*E21B 44/00* (2006.01)
*G06N 20/00* (2019.01)
(Continued)

(52) U.S. Cl.
CPC ............... *E21B 44/00* (2013.01); *E21B 7/04* (2013.01); *E21B 47/0006* (2013.01); *G06N 20/00* (2019.01); *E21B 47/18* (2013.01)

(58) Field of Classification Search
CPC .... E21B 41/0092; E21B 43/26; E21B 43/305; E21B 44/00; E21B 49/00; E21B 49/08;
(Continued)

(56) References Cited

U.S. PATENT DOCUMENTS

| 4,450,354 A | 5/1984 | Smith et al. |
| 4,744,030 A | 5/1988 | Carlson et al. |

(Continued)

FOREIGN PATENT DOCUMENTS

| EP | 2971491 A1 | 1/2016 |
| EP | 3177806 A1 | 6/2017 |

(Continued)

OTHER PUBLICATIONS

Aniket Kumar and Robello Samuel, Halliburton, Casing Wear Factors: How do They Improve Well Integrity Analyses, SPE/IADC-173053-MS, Mar. 2015, pp. 1-18, London, United Kingdom.

(Continued)

*Primary Examiner* — Yong-Suk Ro
(74) *Attorney, Agent, or Firm* — Howard L. Speight, PLLC

(57) ABSTRACT

A casing wear estimation method includes obtaining a set of input parameters associated with extending a partially-cased borehole and applying the set of input parameters to a physics-driven model to obtain an estimated casing wear log. The method also includes employing a data-driven model to produce a predicted casing wear log based at least in part on the estimated casing wear log. The method also includes storing or displaying information based on the predicted casing wear log.

20 Claims, 8 Drawing Sheets

(51) Int. Cl.
*E21B 47/00* (2012.01)
*E21B 7/04* (2006.01)
*E21B 47/18* (2012.01)

(58) Field of Classification Search
CPC ........ E21B 47/18; E21B 47/0006; E21B 7/04; G01V 11/002; G06G 7/48; G06N 20/00
See application file for complete search history.

(56) References Cited

U.S. PATENT DOCUMENTS

| | | | |
|---|---|---|---|
| 2005/0071120 A1* | 3/2005 | Hutchinson | E21B 44/00 702/150 |
| 2005/0125209 A1* | 6/2005 | Soliman | E21B 43/26 703/10 |
| 2008/0188958 A1 | 8/2008 | Herbst | |
| 2011/0017454 A1 | 1/2011 | Sanderlin et al. | |
| 2011/0174541 A1* | 7/2011 | Strachan | E21B 44/00 175/27 |
| 2013/0304444 A1* | 11/2013 | Strobel | E21B 43/26 703/10 |
| 2014/0231072 A1* | 8/2014 | Samuel | E21B 43/30 166/250.1 |
| 2016/0282512 A1* | 9/2016 | Donderici | E21B 43/26 |
| 2017/0227663 A1* | 8/2017 | Ma | G01V 1/288 |
| 2017/0284175 A1* | 10/2017 | Colvin | E21B 43/26 |

FOREIGN PATENT DOCUMENTS

| | | |
|---|---|---|
| WO | 2014209282 A1 | 12/2014 |
| WO | 2016022337 A1 | 2/2016 |

OTHER PUBLICATIONS

Robello Samuel, Aniket Kumar, and Adolfo Gonzales, Halliburton, and Sylvester Marcou and Anne Mette Rod, Statoil, Solving the Casing-Wear Puzzle Using Stiff-String Model, pp. 53-55, JPT, Jul. 2016.

Robello Samuel, Aniket Kumar, and Adolfo Gonzales, Halliburton; Sylvester Marcou and Anne Mette Rod, Statoil, Solving the Casing Wear Puzzle Using Stiff String Model, IADC/SPE-178833-MS, Mar. 2016, pp. 1-17, Fort Worth, Texas.

Innovation, Sciences and Economic Development Canada, Canadian Intellectual Property Office, Examinees Requisition, Application No. 2,961,145, entire document; which is a CA counterpart to the instant application.

Robello Samuel and Aniket Kumar, Halliburton, Modeling Method to Estimate the Casing Wear Caused by Vibrational Impacts of the Drillstring, IADC/SPE 167999, Mar. 2014, pp. 1-10, Fort Worth, Texas.

International Searching Authority, International Search Report and Written Opinion, International application No. PCT/US2014/061128, entire document, which is a PCT parent to the instant application, dated Jul. 8, 2015.

Deli, Gao, Lianzhong, Sun and Jihong, Lian, Prediction of casing wear in extended-reach drilling, Key Laboratory of Petroleum Engineering, Ministry of Education, China University of Petroleum, CACT Operators Group, Nov. 10, 2010, pp. 494-501, Beijing 102249, China, Guangdong 518069, China, Springer-Verlag Berlin Heidelberg.

Hall Jr., R.W., Garkasi, Ali, Deskins, Greg and Vozniak, John, Recent Advances in Casing Wear Technology, Maurer Engineering Incorporated, Feb. 15-18, 1994, pp. 1-8, 1994 IADC/SPE Drilling Conference, Dallas, Texas, United States.

Mitchell, Sarah, Xiang, Yanghua, Improving Casing Wear Prediction and Mitigation Using a Statistically Base Model, B.K. Oil Tools, IADC/SPE 151448, Mar. 6-8, 2012, pp. 1- 15, IADC/SPE Drilling Conference and Exhibition, San Diego, California, USA.

Republique Francaise, Institut National De La Propriete Industrielle, Preliminary Search Report, dated May 25, 2018, 7 pages, France.

* cited by examiner

US 10,487,640 B2

CASING WEAR PREDICTION USING INTEGRATED PHYSICS-DRIVEN AND DATA-DRIVEN MODELS

BACKGROUND

In the search for hydrocarbons and development of hydrocarbon-bearing wells, oilfield operators drill boreholes and perform well completion operations. Example well completion operations include installation of casing sections along a borehole, where each casing section includes multiple casing segments. The drilling crew attaches the casing segments together to form the casing section as it is being lowered into the borehole to a desired position. Once the crew achieves the desired length and position for a particular casing section, they cement it in place to create a permanent casing section installation. The crew may then extend the borehole by drilling through the terminus of the installed casing section. The process of installing casing sections and extending a borehole can be repeated as desired.

During drilling and/or well completion operations, the rotation of the drill string causes frictional wearing along the contact surfaces between the drill string and the casing. Over time, such wearing reduces casing side-wall thickness, degrading the casing strength and integrity. Failure of a casing segment due to wear may result in expensive well repair operations and/or abandoning a well.

Several wireline logging techniques have been developed to measure casing wear. Available wireline logging techniques involve lowering or raising logging tools along the interior of the one or more installed casing sections. Example casing wear logging tools employ acoustic, electromagnetic (EM), or multi-finger caliper technology. While it may be possible to reduce casing failures by frequently and repeatedly deploying casing wear logging tools, such a procedure is not economically feasible as it increases costs and significantly slows the drilling process. Other economically undesirable options to reduce casing failure include using excessively thick casing segments or the employment of high-grade and high-quality piping materials.

As an alternative to the use of overly-conservative thick casing, expensive high-grade casing materials, or the frequent re-logging of casing thickness, some operators rely on physics-driven models to estimate casing wear. Such models often become unworkably complex and/or exhibit large inaccuracies, despite repeated recalibration efforts.

BRIEF DESCRIPTION OF THE DRAWINGS

Accordingly, there are disclosed herein methods and systems for predicting casing wear using a physics-driven model and a data-driven model. In the drawings.

Figure 1A:
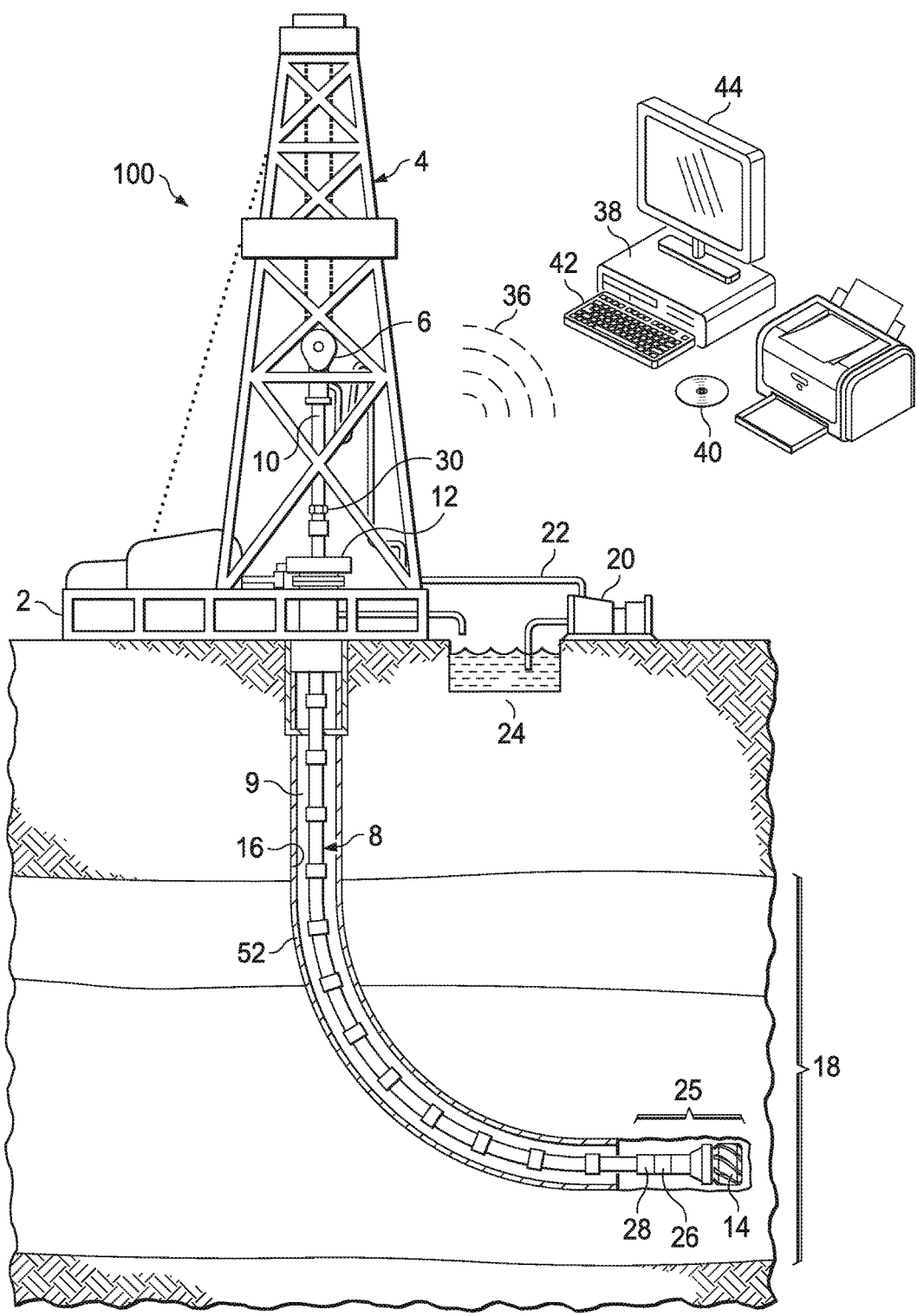
FIG. 1A is a schematic diagram of an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The rapid increase in the number of horizontal, extended-reach, and multi-lateral wells being currently drilled has brought about an additional challenge of casing failure due to drill string-induced casing wear. Disclosed herein are methods and a system for predicting casing wear using both a physics-driven model and a data-driven model. As used herein, a physics-driven model refers to a model that employs well-understood physics principles, such as frictional forces, force balancing, energy conservation, and erosion rates to formulate a casing wear prediction in the form of an analytical equation or a parameter-indexed table of numerical solutions. A physics-driven model may, for example, compute casing wear by integrating differential equations stemming from Newton's laws and/or other laws describing the effect of contact between a drill string and a casing. Example parameters used for physics-driven models include a wear factor, a side force (or parameters related to a side force), drilling parameters that affect the amount, location, and forcefulness of contact (e.g., rotation speed, weight-on-bit, drilling direction), and/or operation time.

Examples of physics-driven models include, but are not limited to, the specific energy model, the linear wear efficiency model, the non-linear casing wear model, the Hertzian model, the impact wear model, and the wellbore energy model. Wellbore parameters used by these models may include, but are not limited to, wear volume, the inside diameter of the casing, and the outside diameter of the joint. The specific energy model relates casing wear to the amount of energy required to excavate a unit volume of material, which is an important parameter used for performance prediction of drilling and associated wear rates. The linear wear efficiency model relates casing wear to the amount of energy dissipated as friction in the wear process. The non-linear casing wear model uses the wellbore parameters to estimate the extent of a casing wear groove. Once this model is run, the resultant differential wear factor is the slope (derivative) of the wear groove volume versus work function curve. The Hertzian model involves the solution of two elastic bodies with curved surfaces in contact with one another, as in the case where a drill string is in contact with a casing wall. The impact wear model simulates phenomena consistent with downhole vibration and its contribution towards wear of the casing walls. Finally, the wellbore energy model provides a mathematical criterion to quantify the borehole quality and incorporates the parameters of borehole curvature and the wellbore torsion. The casing wear estimated by the wellbore energy model is an integral function of these two parameters. Hence, a combined "wear-energy" model is used to estimate casing wear in curved sections of the wellbore that have the drill string lying on its low side. The fundamental assumption of this model is that the volume worn away from the casing wall is proportional to the work done by friction on its inner wall by the joints only.

As used herein, a data-driven model refers to a model that correlates input data with a given output without regard to the principles that govern their relationship. The correlations established for a data-driven model may be the result of statistics, adaptive learning algorithms, and/or other data analysis techniques. In some embodiments, data-driven models may combine both adaptive and non-adaptive elements. Further, data-driven models can vary in complexity from those with only one or two layers of single-direction logic to models employing complicated multi-input, multi-layer, and multi-directional feedback loops. As desired, "weights" can be applied to model parameters, model outputs, or model feedback loops. The correlation training process for data-driven models can be based on sensor-based measurements and/or simulated data. The rules for correlation training may vary and, in some embodiments, are self-taught and/or dynamic. In at least some embodiments, the data-driven model is a regression-based model.

In at least some embodiments, an example method includes obtaining a set of input parameters and applying the set of input parameters to a physics-driven model to obtain an estimated casing wear log. The method also includes employing a data-driven model to produce a predicted casing wear log based at least in part on the estimated casing wear log from the physics-driven model. The method also includes storing or displaying information based on the predicted casing wear log. Various input parameter options, data-driven model training options, and predicted casing wear use options are disclosed herein.

In at least some embodiments, the data-driven model is trained based on casing wear estimates by a physics-driven model and actual casing wear measurements. Once trained, the data-driven model is able to predict casing wear based on subsequent casing wear estimates from a physics-driven model. (Actual casing wear measurements are no longer needed, but may be input to further train the data-driven model). Along with estimated casing wear from a physics-driven model, other input parameters that may be used for training a data-driven model or predicting casing wear using a data-driven model include wellbore parameters (e.g., temperature, fluid viscosity, pressure), casing and drill string parameters (flexibility, resistance to wear, diameter, thickness), and/or drilling parameters (weight-on-bit, rotation rate, torque). In at least some embodiments, such input parameters may correspond to sensor-based data collected from one well or multiple wells. The predicted casing wear output from the data-driven model may correspond to data points or a log for eroded volume, groove depth, wall thickness, safety margin, and/or probability of integrity failure as a function of position along a casing.

In some embodiments, the data-driven model predicts casing wear during a wellbore planning phase (before a drilling project begins). For example, the predicted casing wear may be stored or displayed for use by well planners before a drilling project begins. With the predicted casing wear, well planners may select or update planned drilling parameters (e.g., limits for weight-on-bit, rotation speed, rate of penetrations, or drilling direction), a planned borehole trajectory, and/or a planned casing wall thickness. In other embodiments, the predicted casing wear is stored or displayed for use by drilling operations during a wellbore drilling project. For example, the drilling operators may use the predicted casing wear to update drilling parameters or a borehole trajectory. Further, drilling operators may decide to stop drilling, to perform casing wear logging, or to perform other tasks related to completing a drilling project while reducing the likelihood of casing failure.

In at least some embodiments, the predicted casing wear can be compared to a predetermined threshold indicative of casing failure likelihood. If the predicted casing wear exceeds the predetermined threshold, a warning or other information (e.g., options for reducing the likelihood of casing failure) may be displayed.

FIG. 1A shows an illustrative drilling environment. A drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. Additionally or alternatively, rotation of the drill bit 14 is controlled using a mud motor or other rotation mechanism. As the drill bit 14 rotates, it creates a borehole 16 (represented using dashed lines) that passes through various formations 18. A pump 20 circulates drilling fluid through a feed pipe 22 to the kelly 10, downhole through the interior of drill string 8, through orifices in the drill bit 14, back to the surface via the annulus 9 around the drill string 8, and into a retention pit 24. The drilling fluid transports cuttings from the borehole 16 into the retention pit 24 and aids in maintaining the integrity of the borehole 16.

The drill bit 14 is just one piece of a bottom-hole assembly 25 that includes one or more drill collars 26 and logging tool 28. Drill collars 26 are thick-walled steel pipe sections that provide weight and rigidity for the drilling process. The logging tool 28 (which may be built into one of the drill collars) gathers measurements of various drilling or formation parameters. Without limitation, logging tool 28 may be integrated into the bottom-hole assembly 25 near the bit 14 to collect measurements. The collected measurements may be plotted and used for steering the drill string 8, monitoring drilling performance, and/or to analyze formation properties.

Measurements from the logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used.

The telemetry signals are supplied via a wired or wireless communications link 36 to a computer 38 or some other form of a data processing device. Computer 38 operates in accordance with software (which may be stored on information storage media 40) and user input via an input device 42 to process and decode the received signals. The resulting telemetry data may be further analyzed and processed by computer 38 to generate a display of useful information on a computer monitor 44 or some other form of a display device including a tablet computer. For example, an operator could employ this system to obtain and monitor drilling parameters or formation properties.

In at least some embodiments, measurements collected by the logging tool 28 and/or other sensors (downhole or surface) of the drilling environment of FIG. 1A are used an input parameters to a physics-driven model that estimates casing wear. As described herein, casing wear estimates from a physics-driven model can be input to a data-driven model that predicts casing wear. In some embodiments, such a physics-driven model and a data-driven model are employed by a computer system such as computer 38. The predicted casing wear output from the data-driven model (or related data such as a warning) may be displayed, for example, via computer monitor 44. Further, the computer system employing the physics-driven model and data-driven model may provide a user interface for viewing, selecting, and adjusting physics-driven model options, data-driven model options, training options, warning options, and/or prediction validation options. The computer 38 or another computer may also enable a drilling operator to adjust drilling operations based on the predicted casing wear output from a data-driven model (or related data such as a warning).

In the drilling environment of FIG. 1A, some well completion operations, including installation of a casing 52 representing at least one casing section, have been performed. Installation of each casing section involves joining modular casing segments until a desired casing section length is reached and/or lowering the casing section to a desired position in borehole 16. Once a desired length and position for a particular casing section is achieved, cementing operations are performed, resulting in a permanent casing section installation. As needed, the borehole 16 is extended by drilling through cement at an installed casing section terminus. The process of installing casing sections and extending 16 borehole can be repeated as desired. During drilling and/or well completion operations, the drill string 8 is routinely removed from the borehole 16, optionally reconfigured, and put back into the borehole 16 to continue the drilling process.

In the drilling environment of FIG. 1A, casing wear occurs due to contact between drill string 8 and casing 52. Such contact occurs, for example, during drill string operations, causing wear whenever the drill string 8 rotates. Contact between the drill string 8 and casing 52 is prolonged in curved, sloped, and horizontal portions of the casing 52. Further, it should be appreciated that changing drilling and/or drill string rotation parameters can change the rate of casing wear as well as the points of contact. Over time, contact between the drill string 8 and casing 52 reduces the side-wall thickness of casing 52, degrading the casing strength and integrity.

Figure 1B:
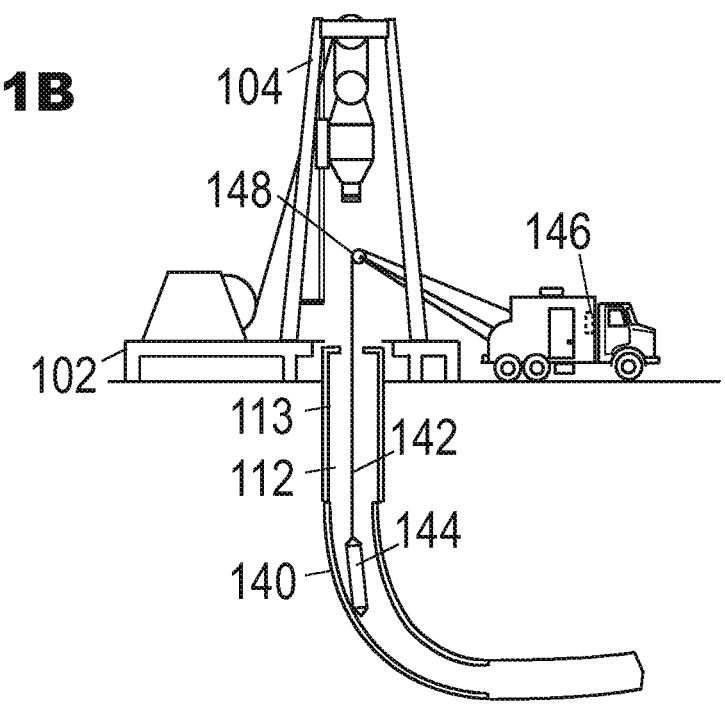
FIG. 1B is a schematic diagram of an illustrative wireline logging environment.

FIG. 1B shows an illustrative wireline logging environment that may represent the environment of FIG. 1A with the drill string 8 removed from the borehole 16 or another similar environment. In FIG. 1B, a first casing section 113 and a second casing section 140 have been installed in a borehole 112. A wireline cable 142 suspends a wireline logging tool 144 in the borehole 112 and couples the tool 144 to a logging facility or vehicle 146, which may include one or more computer systems. A pulley 148 (shown to be part of a wireline truck boom, but alternatively affixed to a platform 102 with a rig 104) enables the wireline logging tool 144 to be lowered and raised along the borehole 112 at a controlled speed. The wireline cable 142 includes electrical and/or optical conductors for transporting measurement data to the logging facility or vehicle 146 and optionally conveying electrical power to the tool 144. In some embodiments, the wireline logging tool 144 may have pads and/or centralizing members to maintain the tool centered in the borehole 112 during logging operations. The wireline logging tool 144 may acquire various types of data related to formation properties or downhole conditions. In accordance with at least some embodiments, the wireline logging tool 144 corresponds to a casing wear logging tool that collects acoustic, electromagnetic (EM), or caliper measurements that can be analyzed to derive a casing wear log as a function of position along the first casing section 113 or second casing section 140.

The logging facility or vehicle 146 receives the measurements collected by the wireline logging tool 144 (e.g., via a wired or wireless link) and a related computer system stores, processes, and/or displays the measurements or related information. In at least some embodiments, casing wear measurements collected by the wireline logging tool 144 are used as input parameters to train a data-driven model as described herein. Further, other measurements collected by the wireline logging tool 144 and/or other sensors/tools may be used as input parameters to a physics-driven model that estimates casing wear. Again, casing wear estimates from a physics-driven model can be input to a data-driven model that predicts casing wear. In some embodiments, such a physics-driven model and a data-driven model are employed by a computer system associated with logging facility or vehicle 146. The predicted casing wear output from the data-driven model (or related data such as a warning) may be displayed, for example, via a computer monitor. Further, a computer system employing the physics-driven model and data-driven model may provide a user interface for viewing, selecting, and adjusting physics-driven model options, data-driven model options, training options, warning options, and/or prediction validation options. In at least some embodiments, a computer associated with logging facility or vehicle 146 or another computer enables a drilling operator to adjust drilling parameters based on the predicted casing wear output from a data-driven model (or related data such as a warning). The adjusted drilling parameters may apply after well completion operations add another casing section in the borehole 112 and/or after drill string operations positions a drill string in borehole 112.

In at least some embodiments, an estimated casing wear log from a physics-driven model and a measured casing wear log associated with a first borehole segment are used to train a data-driven model. Thereafter, a subsequent estimated casing wear log is obtained from a physics-driven model. The trained data-driven model uses the subsequent estimated casing wear log to predict casing wear for a second borehole segment. As desired, at least one drilling component can be directed based on the predicted casing wear. Such direction may be manual or automated. Further, the amount of adjustment to drilling parameters may vary depending on the rate of wear or other calculations performed using the predicted casing wear.

Figure 1C:
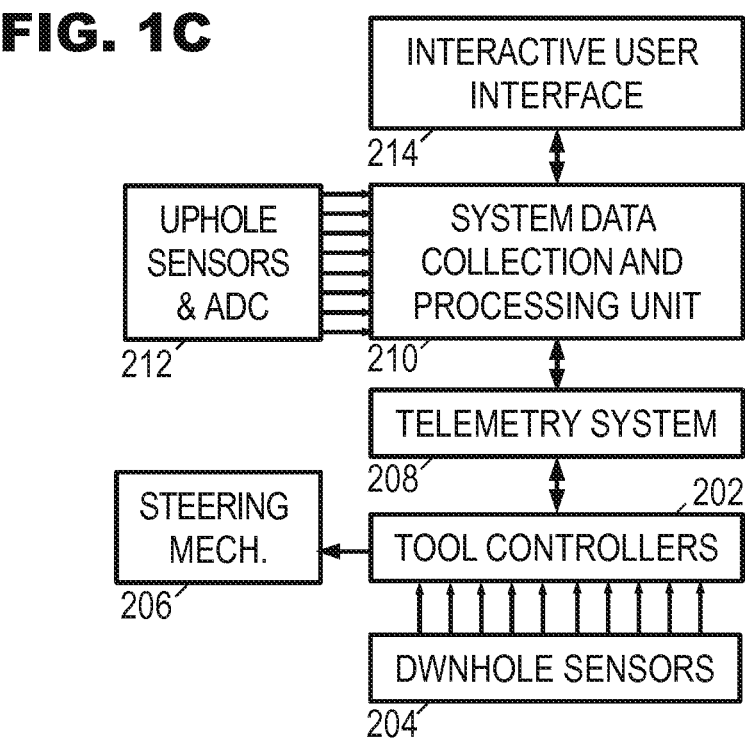
FIG. 1C is a function-block diagram of an illustrative directional drilling system.

FIG. 1C is a function-block diagram of an illustrative directional drilling system (e.g., as in FIG. 1A), though the illustrated modules are also largely representative of a wireline logging system (e.g., as in FIG. 1B). In FIG. 1C, one or more downhole tool controllers 202 (e.g., processors) collect measurements from a set of downhole sensors 204. Example sensors 204 include navigational sensors, drilling parameter sensors, and formation parameter sensors. The output of the sensors 204 are digitized and stored with optional downhole processing to compress the data, improve the signal-to-noise ratio, and/or to derive parameters of interest from the measurements. In at least some embodiments, the downhole sensors 204 measure casing wear by employing EM coils, acoustic sensors, and/or multi-finger calipers.

A telemetry system 208 conveys at least some of the measurements or derived parameters to a processing system 210 at the surface. The processing system 210 also may collect, record, and process measurements from sensors 212 on and around a drilling platform (e.g., platform 2 in FIG.

1A) in addition to downhole measurements. The processing system 210 outputs information for display on interactive user interface 214. Examples of information that may be displayed include, for example, measurement logs, a borehole trajectory, a casing trajectory, a predicted casing wear log, and recommended drilling parameters to reduce a risk of casing failure to below a threshold. The processing system 210 may further accept user inputs and commands and direct operations in response to such inputs to, e.g., transmit commands and configuration information via telemetry system 208 to the tool controllers 202. Such commands may alter the settings of a steering mechanism 206 or other controllable drilling parameters.

Figure 2:
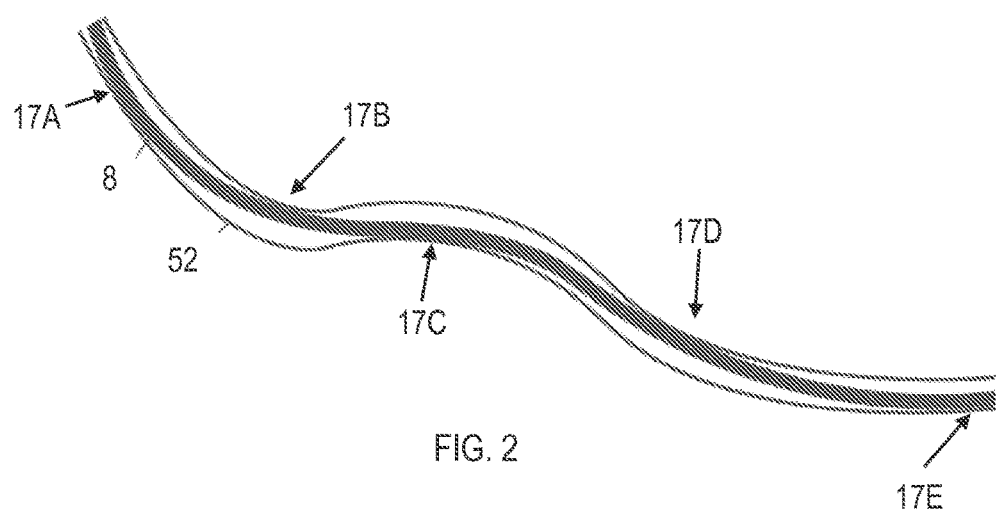
FIG. 2 is a diagram of an illustrative casing and drill string tension scenario showing high-wear areas.

As illustrated by FIG. 2, a casing 52 may have multiple curves resulting in multiple contact regions 17A-17E between drill string 8 and casing 52 with the drill string 8 moving upward in a tension scenario. The amount of casing wear that occurs due to contact between drill string 8 and casing 52 is affected by the number of curves along casing 52, the angle of curves along casing 52, the flexibility of the casing material, the flexibility of the drill string material, the casing diameter, and the drill string diameter. In general, a casing trajectory with higher "dogleg" trajectory changes will experience more casing wear. In at least some embodiments, the operator may reduce casing wear by modifying drilling parameters including, but not limited to, changing the well profile, changing parameters to reduce contact force, changing the material properties of the drill string, drill bit, or casing to a higher quality material, or adding drill pipe protection equipment (not shown). Drill pipe protection equipment includes a cover that envelops the drill string circumference in a plastic sleeve, said sleeve's outer surface does not rotate when the drill string is rotating, thus reducing contact force and subsequent casing wear.

Figure 3A:
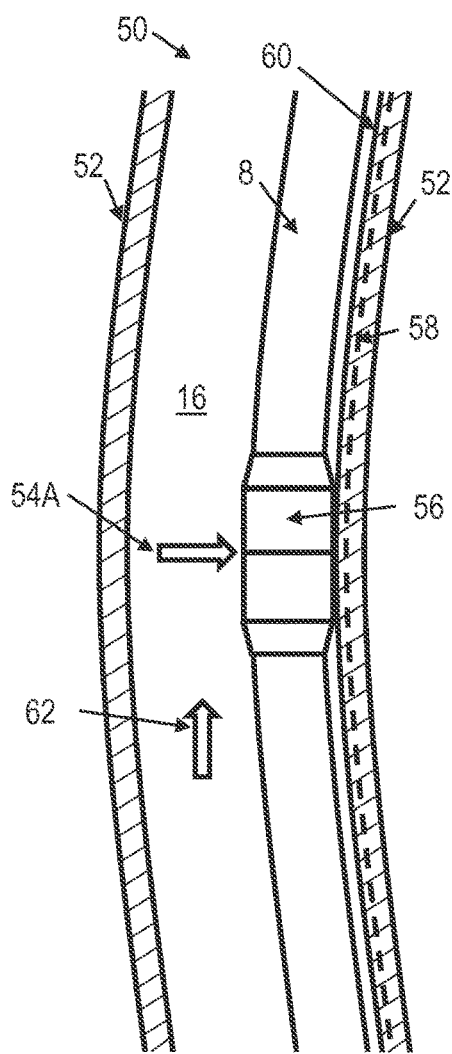
FIG. 3A is a cross-sectional view showing a tension scenario for a drill string in a casing.

FIG. 3A shows a tension scenario 50 as seen in FIG. 2 in greater detail for a drill string in a casing. In tension scenario 50, the drill string 8 is being withdrawn or pulled in an upward direction 62 in relation to the borehole 16. The drill string 8, under tension, creates a normal force 54A that causes a joint 56 along the drill string 8 to contact inner wall 60 of casing 52, contributing to casing wear. Significantly, the drill string drill bit 14 (seen in FIG. 1A) contributes the majority of wear to a casing 52 during drilling operations. Over time, the resulting casing wear removes casing material and may surpass a threshold 58 corresponding to a casing integrity threshold. Such casing wear can be continuous or in isolated areas along casing 52. In either case, casing wear may eventually result in failure of the casing 52 such that fluids are able to enter or escape the casing 52.

Figure 3B:
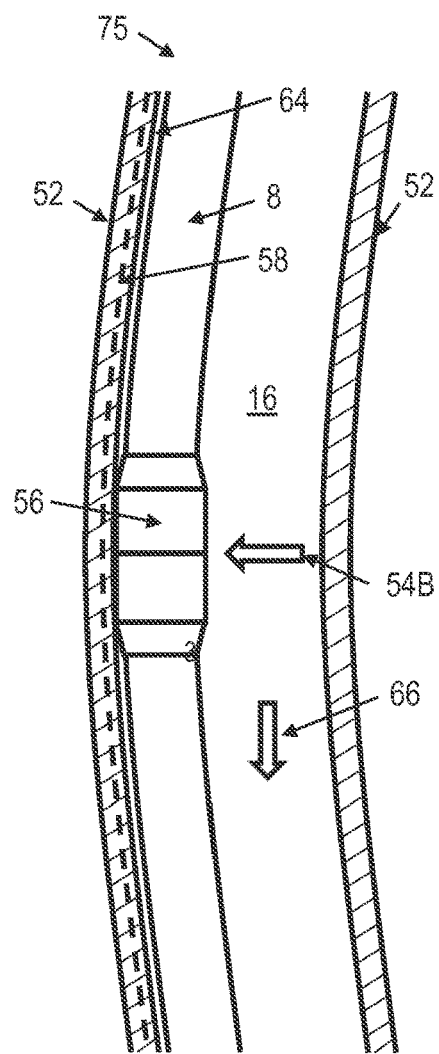
FIG. 3B is a cross-sectional view showing a compression scenario for a drill string in a casing.

FIG. 3B is a cross-section of a compression scenario 75. In compression scenario 75, the drill string 8 is being inserted or pushed in a downward direction 66 in relation to the borehole 16. The drill string 8, under compression, creates a normal force 54B that causes a joint 56 along the drill string 8 to contact inner wall 64 of casing 52, contributing to casing wear. Over time, the resulting casing wear removes casing material and may surpass a threshold 58 corresponding to a casing integrity threshold. Such casing wear can be continuous or in isolated areas along casing 52. In either case, casing wear may eventually result in failure of the casing 52 such that fluids are able to enter or escape the casing 52.

As repairing a casing such as casing 52 is difficult, the disclosed casing wear prediction methods and systems are employed to minimize or avoid casing failure. In at least some embodiments, casing wear prediction involves obtaining an estimated casing wear from a physics-driven model and applying the estimated casing wear as an input to a data-driven model. The data-driven model produces a predicted casing wear log based at least in part on the estimated casing wear.

In accordance with at least different embodiments, the physics-driven model that estimates casing wear may account for different casing trajectories (see FIG. 2). Such casing trajectories can be simulated via software and/or can be estimated from position/orientation data collected by measurement-while-drilling (MWD) or logging-while-drilling (LWD) tools during a drilling process and/or by wireline logging tools. Further, the physics-driven model that estimates casing wear may account for different contact/force scenarios (see FIGS. 3A and 3B). For example, a side force (e.g., normal forces 54A or 54B in FIGS. 3A and 3B) may be estimated as a function of bending stiffness and various forces operating on a drill string inside a casing such as viscous drag, torque, gravity, buoyancy, compression, and vibration. Without limitation, a physics-driven model may also account for other parameters including a wear factor, a rotation rate, and a measure of the drilling time. The rotation rate and drilling time may be measured by downhole or surface sensors. Meanwhile, the wear factor may be based on the materials of the casing and drill strings and/or may be derived from laboratory tests.

In different embodiments, the estimated casing wear output from a physics-driven model may be expressed in various formats such as an eroded volume, a groove depth, a casing wall thickness, a safety margin, or a probability of integrity failure. The predicted casing wear output from a data-derived model may likewise be expressed in various formats and may or may not have the same format as the estimated casing wear provided as input to the data-driven model.

Figure 3C:
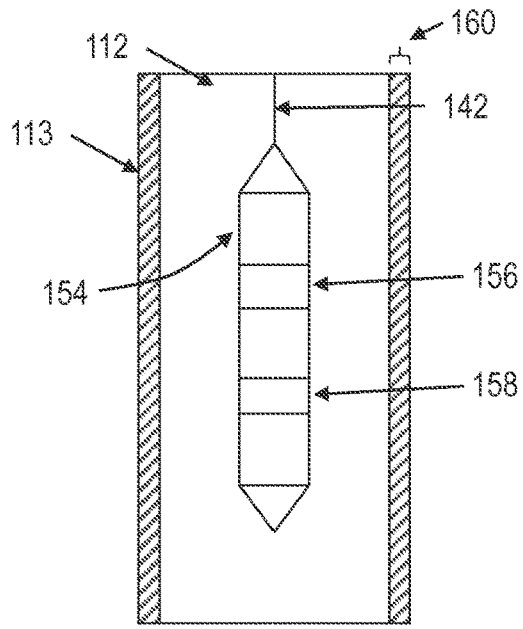
FIG. 3C is cross-sectional view showing an illustrative casing wear logging tool in a borehole.

FIG. 3C shows a casing wear logging tool 154 deployed along a casing 113 in a borehole 112 to measure casing wear. In at least some embodiments, the casing wear logging tool 154 may be deployed as a wireline logging tool (see e.g., FIG. 1B). For wireline logging embodiments, power delivery, telemetry, and positioning for the casing wear logging tool 154 may be supported by a wireline case 142. Alternatively, some casing wear logging tools 154 may correspond to logging-while-drilling (LWD) tools. For LWD tool embodiments, the casing wear logging tool 154 may be part of a bottom-hole assembly (BHA) (e.g., BHA 25 as in FIG. 1A). The casing wear logging tool 154 employs sensors 158 and possibly a signal source 156 to directly or indirectly measure a casing thickness 160 as a function of position along casing 113. For acoustic sensing of casing wear, signal source 156 emits an acoustic signal and sensors 158 receive corresponding acoustic reflections. The timing of reflections relative to the emitted acoustic signals can be used to derive the position of the reflective surface (the casing wall). The position of the reflective surface varies depending on the amount of casing wear. For EM sensing of casing wear, signal source 156 emits an EM signal and sensors 158 detect a corresponding magnetic field. As the strength of the magnetic field detected by the sensors 158 is affected by the thickness of the casing 113, casing thickness can be derived from the magnetic field measurements. For multi-finger caliper sensing of casing wear, a signal source 156 is not needed and the sensors 158 measure small movements or tension of finger (prong) calipers dragged along the surface of casing 113. Casing thickness can be derived from the movement or tension variation of the finger calipers. In at least some embodiments, one or more measured casing wear logs obtained from a casing wear logging tool 154 are used to train the data-driven model. While exceptions are possible, the availability of measured casing wear logs to train a data-driven model is usually limited due to expense. Once trained, the data-driven model is employed to predict casing wear without the use of measured casing wear logs. Of course, if more measured casing wear logs become available, the training of the data-driven model can be updated accordingly.

Figure 4:
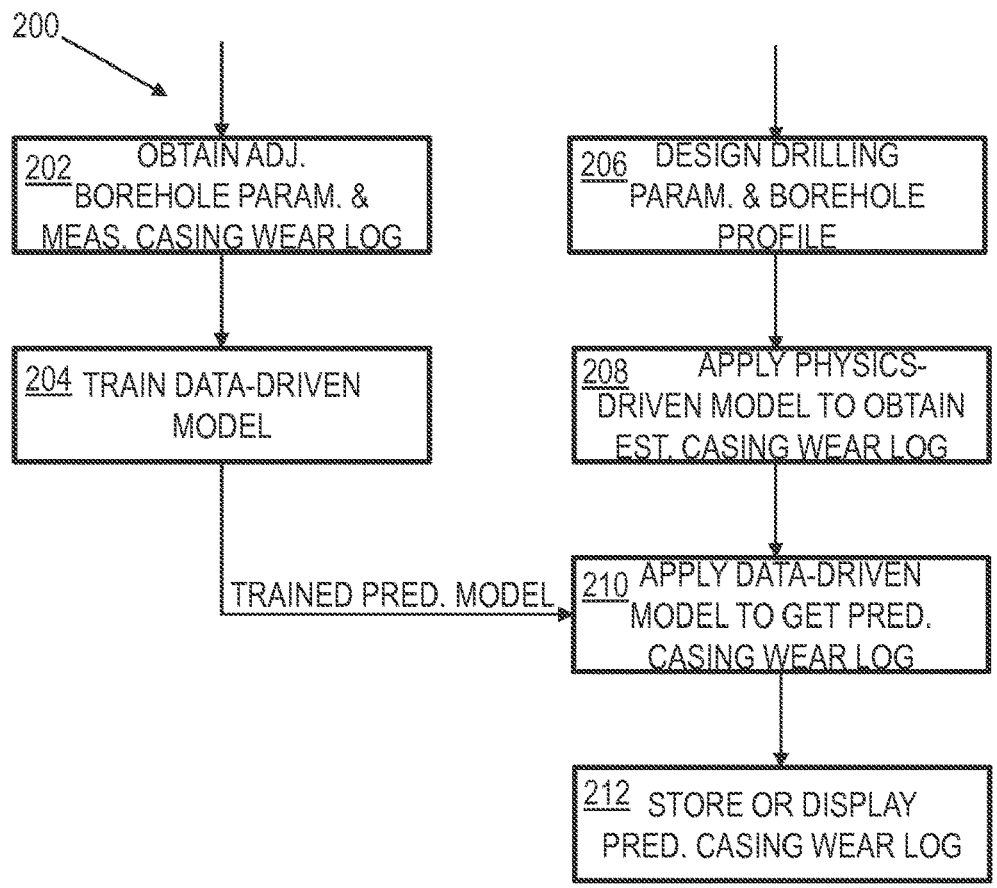
FIG. 4 is a block diagram of a process for predicting casing wear during a wellbore planning phase.

FIG. 4 presents an illustrative process 200 for predicting casing wear during a wellbore planning phase. The process 200 may be implemented by computer 38 (FIG. 1A) and/or another computer. At block 202, input parameters and a measured casing wear log from an adjacent borehole are obtained. At block 204, the input attributes and the measured casing wear log is used to train a data-driven model. The output of block 204 is a trained casing wear prediction model. At block 206, design drilling parameters and borehole profile information are obtained. At block 208, the design drilling parameters and borehole profile information obtained at block 206 are applied to a physics-driven model to obtain an estimated casing wear log. The physics-driven model may be one of several available models, e.g., a specific energy model, a linear wear-efficiency model, a non-linear casing wear model, a Hertzian model, an impact wear model, or a wellbore energy model. At block 210, the trained data-driven model obtained at block 204 is used to produce a predicted casing wear log based at least in part on the estimated casing wear log obtained at block 208. At block 212, the predicted casing wear log is displayed or stored for use by a well planner before drilling begins.

Figure 5:
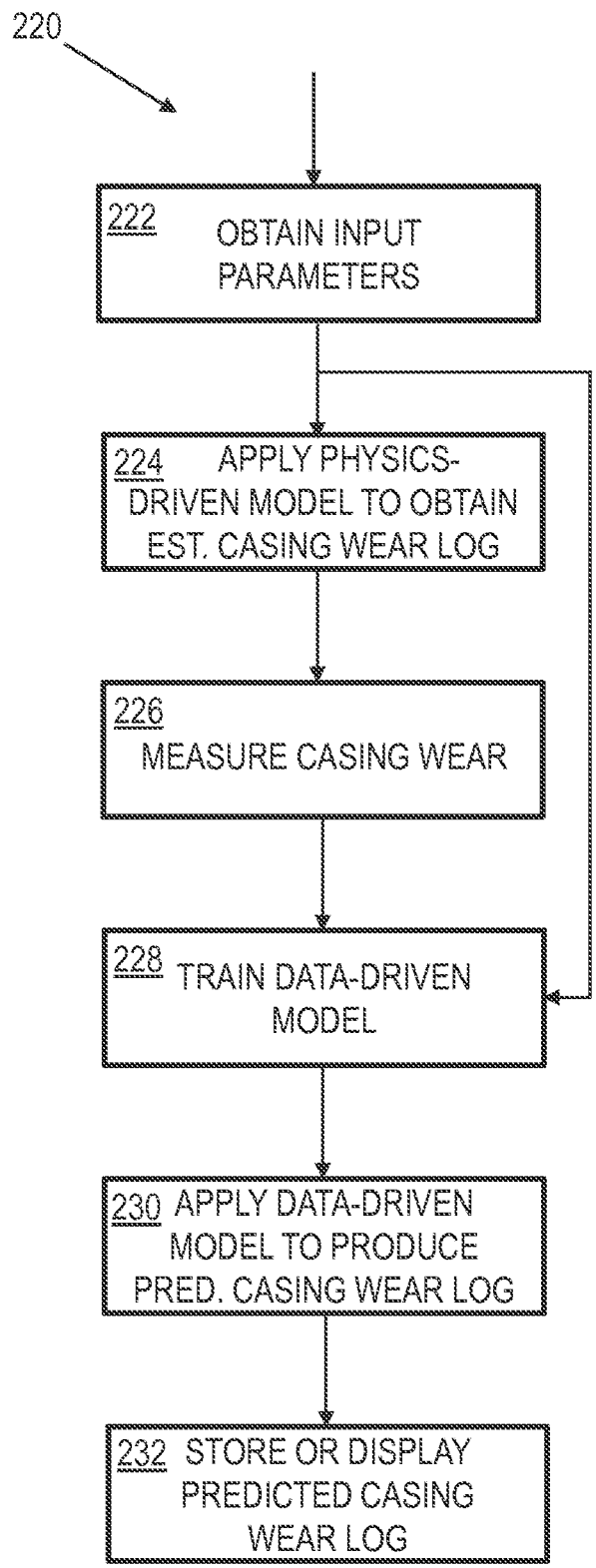
FIG. 5 is a block diagram of a process for predicting casing wear during a wellbore drilling phase.

FIG. 5 presents an illustrative process 220 for predicting casing wear during a wellbore drilling phase. The process 220 may be implemented by computer 38 (FIG. 1A) and/or another computer. At block 222, input parameters are obtained. The input parameters may correspond to drilling parameters, borehole trajectory parameters, downhole condition parameters, casing attributes, drill string attributes, and/or other parameters employed by physics-driven models. At block 224, a physics-driven model is applied to obtain an estimated casing wear log based on the input parameters obtained at block 222. Again, the physics-driven model may be one of several available models, e.g., a specific energy model, a linear wear-efficiency model, a non-linear casing wear model, a Hertzian model, an impact wear model, or a wellbore energy model. At block 226, casing wear is measured. For example, a measured casing wear log may be obtained using a casing wear logging tool 154 deployed as a LWD tool or wireline tool. At block 228, the prediction data-driven model is trained using measured casing wear obtained at block 226 and the input parameters obtained at block 222. At block 230, the data-driven model is applied to produce a predicted casing wear log based on subsequent input parameters obtained while drilling. At block 232, the predicted casing wear log is stored or displayed for use by an operator during drilling operations. The drilling operator may, for example, select to adjust controllable drilling parameters so as to reduce the likelihood of casing failure. In some embodiments, a drilling controller and/or drilling components (to direct weight-on-bit, rotation rate, rate of penetration, and/or drilling fluid parameters) can be directed automatically in accordance with the predicted casing wear log or related values output from the data-driven model. Alternatively, drilling suggestions (e.g., reduce rotation speed by 10%, reduce weight-on-bit by 5%, change trajectory to reduce dogleg angle by 8%) may be presented to an operator in accordance with the predicted casing wear log.

Figure 6:
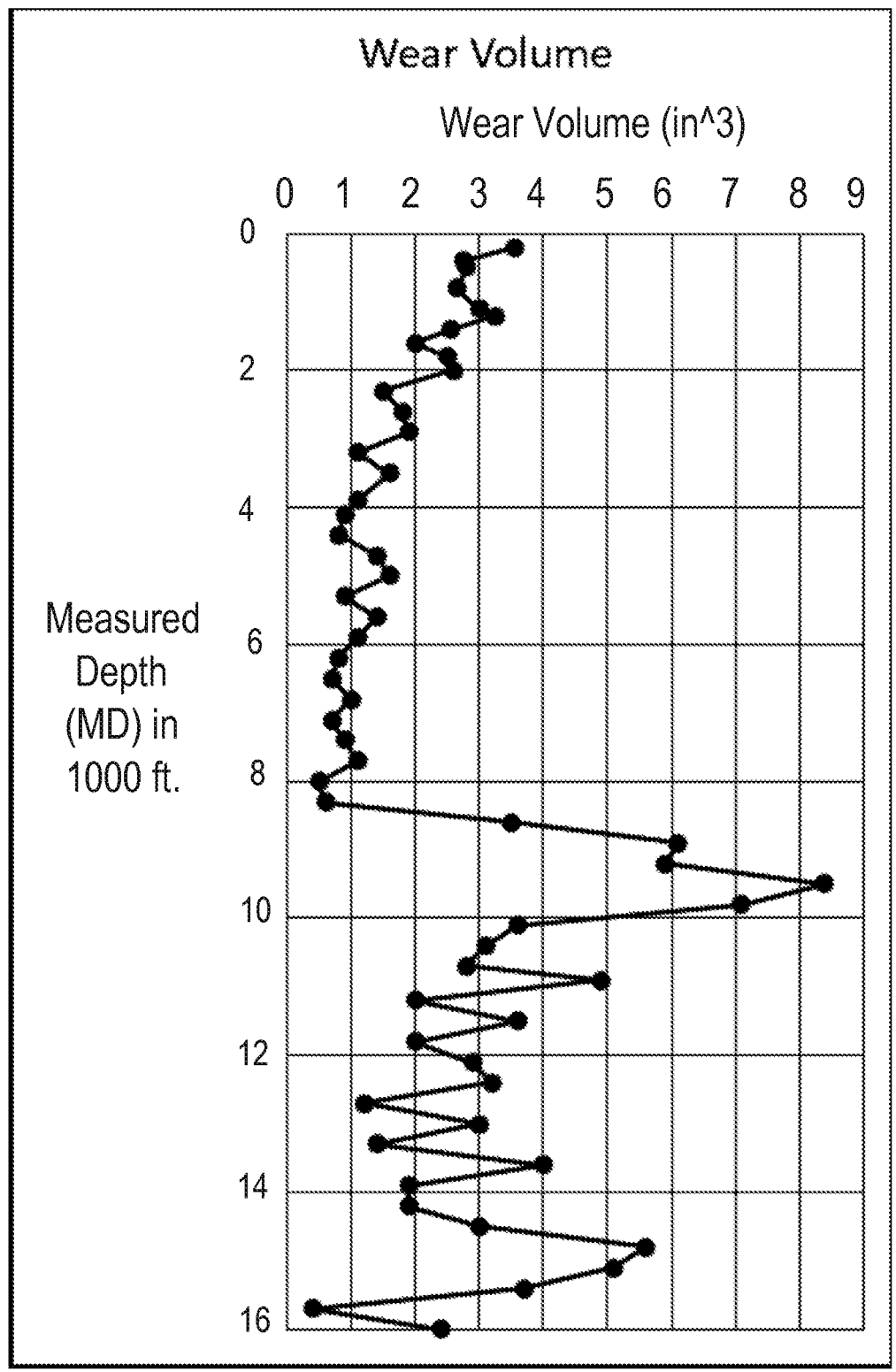
FIG. 6 is a chart showing an illustrative type of predicted casing wear log.

FIG. 6 is an illustrative chart of a type of predicted casing wear log output from the data-driven model in block 230. In FIG. 6, wear volume (in cubic inches) is plotted as a function of measured depth. The wear volume represented in FIG. 6 may be an estimate of existing casing wear, based on a set of collected input parameters, or a prediction of the amount of material that, based on a set of proposed input parameters, will be removed from the inner wall of the casing due to contact between the drill string and the casing.

Figure 7:
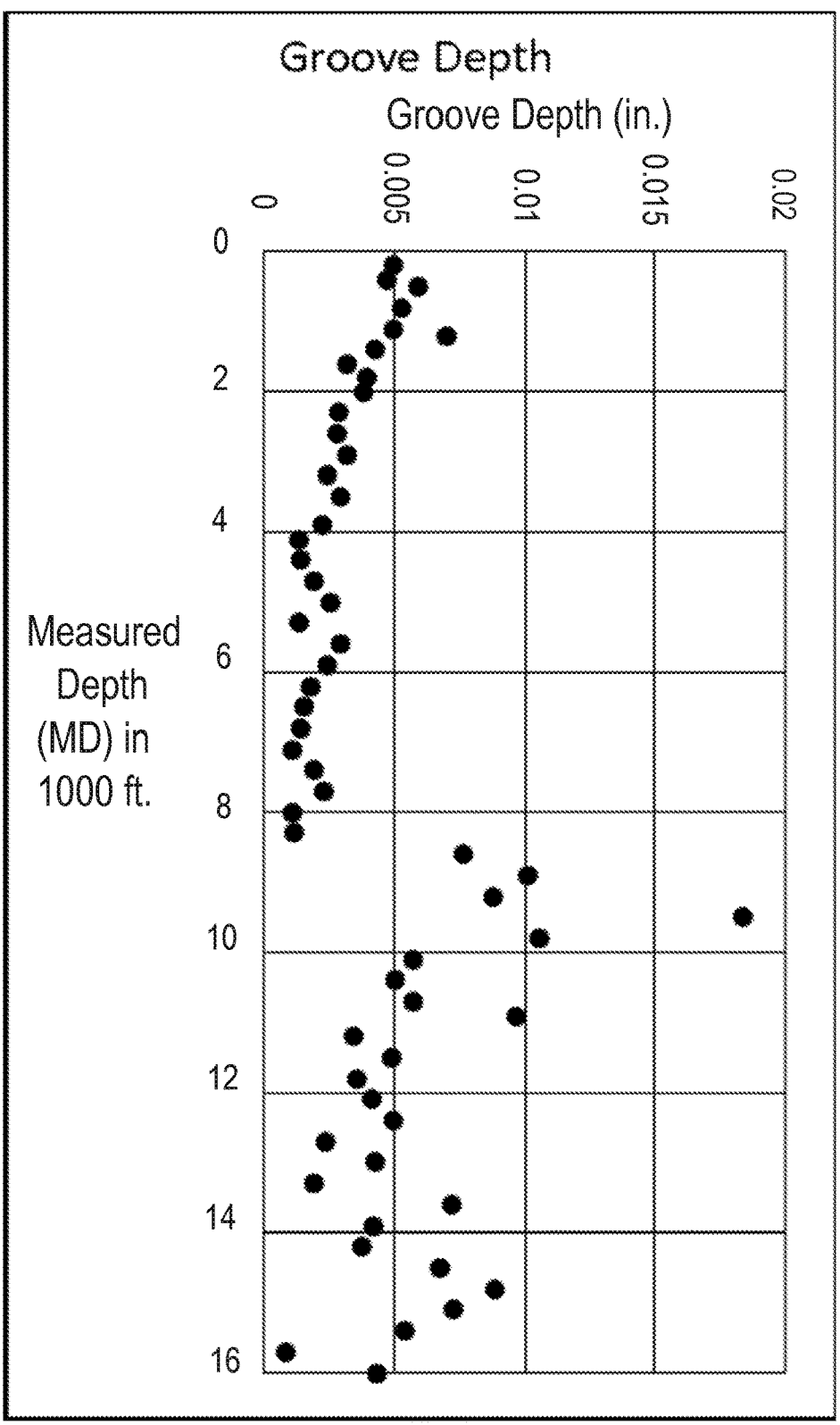
FIG. 7 is a chart showing another illustrative type of predicted casing wear log.

FIG. 7 is a similarly illustrative chart of another type of predicted casing wear as a function of depth, with casing wear expressed in terms of groove depth rather than as the wear volume of FIG. 6. In different logs, groove depth can alternatively be represented as a percentage of wall thickness worn away, a percentage of wall thickness remaining, or a percentage of wall strength deteriorated.

In accordance with at least some embodiments, the disclosed methods and systems related to predicting casing wear may be implemented in digital electronic circuitry, or in computer software, firmware, or hardware, including the structures disclosed in this specification and their structural equivalents, or in combinations of one or more of them. Computer software may include, for example, one or more modules of instructions, encoded on computer-readable storage medium for execution by, or to control the operation of, a data processing apparatus. Examples of a computer-readable storage medium include random access memory (RAM) devices, read only memory (ROM) devices, optical devices (e.g., CDs or DVDs), and disk drives.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors and processors of any kind of digital computer. Generally, a processor will receive instructions and data from a read-only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 8:
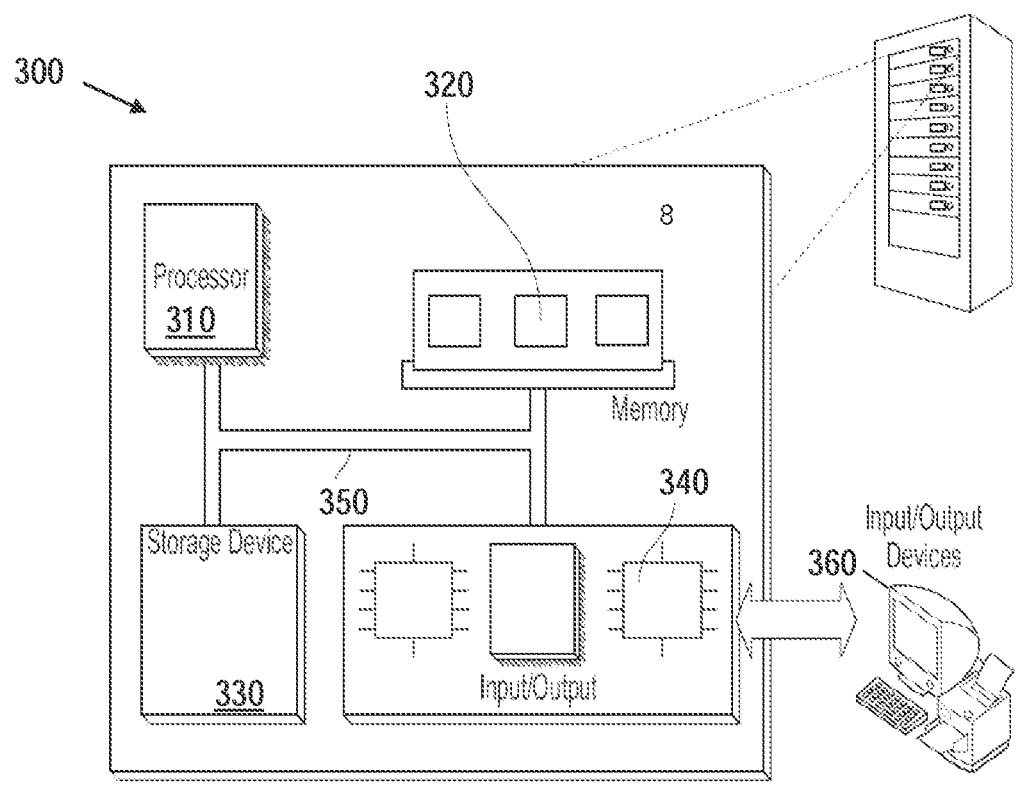
FIG. 8 is an illustrative casing wear prediction system.

FIG. 8 shows an illustrative system 300. The prediction system 300 may correspond to the computer system 38 mentioned in FIG. 1A and/or another computer system involved with obtaining input parameters, obtaining measured casing wear logs, obtaining estimated casing wear logs from a physics-driven model, training a data-driven model, using a trained data-driven model to predict casing wear, and/or using the predicted casing wear output from a data-driven model to plan future wells, to adjust drilling operations in real-time, or to perform other tasks as described herein.

The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In some embodiments, the processor 310 is a single-threaded processor, a multi-threaded processor, or another type of processor. The processor 310 is capable of processing instructions stored in the memory 320 or on the storage device 330. The memory 320 and the storage device 330 can store information within the computer system 300.

The input/output device 340 provides input/output operations for the system 300. In some embodiments, the input/output device 340 can include one or more network interface devices, e.g., an Ethernet card; a serial communication device, e.g., an RS-232 port; and/or a wireless interface device, e.g., an 802.11 card, a 3G wireless modem, or a 4G wireless modem. In some embodiments, the input/output device can include driver devices configured to receive input data and send output data to other input/output devices, e.g., keyboard, printer and display devices 360. In some embodiments, mobile computing devices, mobile communication devices, and other devices can be used.

The disclosed options for predicting casing wear should not be construed as limitations on the scope of what may be claimed, but rather as descriptions of features specific to particular examples. Certain features that are described in this specification in the context of separate embodiments can also be combined. Conversely, various features that are described in the context of a single embodiment can also be implemented in multiple embodiments separately or in any suitable combination.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

Embodiments disclosed herein include:

A: A casing wear estimation method that comprises obtaining a set of input parameters associated with extending a partially-cased borehole, applying the set of input parameters to a physics-driven model to obtain an estimated casing wear log, employing a data-driven model to produce a predicted casing wear log based at least in part on said estimated casing wear log, and storing or displaying information based on the predicted casing wear log.

B: A casing wear estimation system that comprises at least one processor, a memory in communication with the at least one processing and storing instructions that, when executed, causes the at least one processor to obtain a set of input parameters, apply the set of input parameters associated with extending a partially-cased borehole to a physics-driven model to obtain an estimated casing wear log, employ a data-driven model to produce a predicted casing wear log based at least in part on said estimated casing wear log, and store or display information based on the predicted casing wear log.

C: A drilling system that comprises a processor configured to obtain an estimated casing wear log from a physics-driven model and a measured casing wear log associated with a first borehole segment, train a data-driven model using the estimated casing wear log and the measured casing wear log, acquire a subsequent estimated casing wear log from a physics-driven model, use the trained data-driven model and the subsequent estimated casing wear log to predict casing wear for a second borehole segment, and at least one drilling component in communication with the processor, wherein the processor directs an operation of the at least one drilling component based on the predicted casing wear log.

Each of embodiments A, B, and C may have one or more of the following additional elements in any combination: Element 1: further comprising training the data-driven model based on casing wear measurements associated with a previously drilled borehole. Element 2: further comprising training the data-driven model based on casing wear measurements associated with a borehole that is being drilled. Element 3: further comprising training the data-driven model based on at least one wellbore parameter. Element 4: further comprising training the data-driven model based on at least one drilling parameter. Element 5: wherein the data-driven model is regression-based. Element 6: further comprising comparing at least some of the predicted casing wear logs to a predetermined threshold and displaying a warning based on the comparison. Element 7: wherein said employing the data-driven model occurs during a wellbore planning phase and wherein the method further comprises modifying a drilling plan based at least in part on the predicted casing wear log. Element 8: wherein the modified drilling plan includes at least one modified limit on at least one drilling parameter selected from the list consisting of weight on bit, rotation rate, rate of penetration, and torque. Element 9: wherein the modified drilling plan includes at least one modified parameter including modifying the well profile, changing the drilling parameters to reduce contact force, changing the materials properties, and the addition of drill pipe protection equipment. Element 10: wherein said employing the data-driven model occurs during a wellbore drilling phase and wherein the method further comprises modifying a drilling parameter for a wellbore being drilled based at least in part on the predicted casing wear log. Element 11: wherein the physics-driven model corresponds to at least one of a specific energy model, a linear wear-efficiency model, a non-linear casing wear model, a Hertzian model, an impact wear model, and a wellbore energy model. Element 12: wherein the predicted casing wear log is a function of at least one casing wear value selected from the list consisting of an eroded volume, a groove depth, a wall thickness, a safety margin, and a probability of integrity failure. Element 13: wherein the instructions further cause the at least one processor to train the data-driven model based on casing wear measurements associated with a previously drilled borehole. Element 14: wherein the instructions further cause the at least one processor to train the data-driven model based on casing wear measurements associated with a borehole that is being drilled. Element 15: wherein the instructions further cause the at least one processor to train the data-driven model based on at least one of a wellbore parameter and a drilling parameter. Element 16: wherein the instructions further cause the at least one processor to compare at least some of the predicted casing wear log to a predetermined threshold and to display a warning based on the comparison. Element 17: wherein the instructions further cause the at least one processor to modify a drilling plan for a future wellbore based at least in part on the predicted casing wear log. Element 18: wherein the instructions further cause the at least one processor to modify a drilling parameter for a wellbore being drilled based at least in part on the predicted casing wear log.

Numerous variations and modifications will become apparent to those skilled in the art once the above disclosure is fully appreciated. It is intended that the following claims be interpreted to embrace all such variations and modifications.

What is claimed is:

1. A casing wear estimation method that comprises:
   obtaining a set of input parameters associated with extending a partially-cased borehole;
   applying the set of input parameters to a physics-driven model to obtain an estimated casing wear log; and
   employing a data-driven model to produce a predicted casing wear log based at least in part on said estimated casing wear log; and
   storing or displaying information based on the predicted casing wear log.

2. The method of claim 1, further comprising training the data-driven model based on casing wear measurements associated with a previously drilled borehole.

3. The method of claim 1, further comprising training the data-driven model based on casing wear measurements associated with a borehole that is being drilled.

4. The method of claim 1, further comprising training the data-driven model based on at least one wellbore parameter.

5. The method of claim 1, further comprising training the data-driven model based on at least one drilling parameter.

6. The method of claim 1, wherein the data-driven model is regression-based.

7. The method of claim 1, further comprising comparing at least some of the predicted casing wear log to a predetermined threshold, and displaying a warning based on the comparison.

8. The method of claim 1, wherein said employing the data-driven model occurs during a wellbore planning phase, and wherein the method further comprises modifying a drilling plan based at least in part on the predicted casing wear log.

9. The method of claim 8, wherein:
   the modified drilling plan includes at least one modified limit on at least one drilling parameter selected from the list consisting of weight on bit, rotation rate, rate of penetration, and torque; and
   the modified drilling plan includes at least one modified parameter including modifying the well profile, changing the drilling parameters to reduce contact force, changing the materials properties, and the addition of drill pipe protection equipment.

10. The method of claim 1, wherein said employing the data-driven model occurs during a wellbore drilling phase, and wherein the method further comprises modifying a drilling parameter for a wellbore being drilled based at least in part on the predicted casing wear log, changing the drill string materials, and adding drill string protection equipment.

11. The method of claim 1, wherein the physics-driven model corresponds to at least one of a specific energy model, a linear wear-efficiency model, a non-linear casing wear model, a Hertzian model, an impact wear model, and a wellbore energy model.

12. The method of claim 1, wherein the predicted casing wear log is a function of at least one casing wear value selected from the list consisting of an eroded volume, a groove depth, a wall thickness, a safety margin, and a probability of integrity failure.

13. A casing wear estimation system that comprises:
   at least one processor;
   a memory in communication with the at least one processing and storing instructions that, when executed, causes the at least one processor to:
   obtain a set of input parameters associated with extending a partially-cased borehole;
   apply the set of input parameters to a physics-driven model to obtain an estimated casing wear log; and employ a data-driven model to produce a predicted casing wear log based at least in part on said estimated casing wear log; and store or display information based on the predicted casing wear log.

14. The system of claim 13, wherein the instructions further cause the at least one processor to train the data-driven model based on casing wear measurements associated with a previously drilled borehole.

15. The system of claim 13, wherein the instructions further cause the at least one processor to train the data-driven model based on casing wear measurements associated with a borehole that is being drilled.

16. The system of claim 13, wherein the instructions further cause the at least one processor to train the data-driven model based on at least one of a wellbore parameter and a drilling parameter.

17. The system of claim 13, wherein the instructions further cause the at least one processor to compare at least some of the predicted casing wear log to a predetermined threshold, and to display a warning based on the comparison.

18. The system of claim 13, wherein the instructions further cause the at least one processor to modify a drilling plan for a future wellbore based at least in part on the predicted casing wear log.

19. The system of claim 13, wherein the instructions further cause the at least one processor to modify a drilling parameter for a wellbore being drilled based at least in part on the predicted casing wear log.

20. A drilling system that comprises:
a processor configured to obtain an estimated casing wear log from a physics-driven model and a measured casing wear log associated with a first borehole segment, to train a data-driven model using the estimated casing wear log and the measured casing wear log, to acquire a subsequent estimated casing wear log from a physics-driven model, and to use the trained data-driven model and the subsequent estimated casing wear log to predict casing wear for a second borehole segment; and at least one drilling component in communication with the processor, wherein the processor directs an operation of the at least one drilling component based on the predicted casing wear log.

* * * * *